Patented Aug. 1, 1939

2,167,723

UNITED STATES PATENT OFFICE 2,167,723

METHOD OF PREPARING FISH MEAL FOR STORAGE AND SHIPPING

Edgar T. Meakin, San Francisco, Calif.

No Drawing. Application July 3, 1936,
Serial No. 88,767

2 Claims. (Cl. 99—2)

My invention relates to food products and the method of processing the same, and particularly to fish or meat meal in consolidated form adapted especially for storage, preservation and handling, and which is useful as a food concentrate in the feeding of livestock and poultry.

Among the objects of my invention are:

To provide a consolidated meal product capable of retaining its potent properties over long periods of time; to produce a meal product in a form highly resistant to bacteria and insect life; to provide a meat or fish meal product in the form of consolidated units wherein substantially all voids have been removed; to provide, from a meal containing an oxidizable oil, a consolidated unit adapted to prevent substantial oxidation of the oil contained therein; to provide a consolidated meal product which is particularly adapted for storage, handling and shipping, and which is highly resistant to deterioration; and to provide a new and economical method for the handling of fish or meat meal.

My invention possesses numerous other objects and features of advantage, some of which, together with the foregoing, will be set forth in the following description forming a part of this specification, but I do not limit myself to the specific embodiment of my invention herein described, as various changes and modifications thereof may be resorted to without departing from the scope of the claims.

Food concentrates in meal form have long been employed to supplement the basal feed rations of livestock and poultry. Fish meal, however, is probably the best known of all food concentrates, and its use as a foodstuff for man's domestic animals dates back many centuries. It is particularly valuable for feeding purposes because of its high protein content, vitamin potency and variety and type of minerals, all of which constituents are in a form readily assimilated by the system. The superiority of fish meal over other food concentrates such as meat meal, cottonseed meal, soybean meal and the like, is now generally recognized, and the commercial production thereof to meet the ever increasing demands amounts to more than 120,000 tons annually on the Pacific Coast of the United States of America and Canada alone.

In order that my invention may be thoroughly understood, it is desirable to know something of the manufacture and composition of fish meal. For feeding purposes, fish meal is produced only from fresh material. The fresh raw fish are first thoroughly cooked, preferably by steam, to break down the flesh. The cooked mass is then pressed to remove the liquids, and the remaining solids are then dried, ground into meal of the required standard of fineness, and sacked for shipment or storage. The composition of commercial fish meal, while varying considerably, depending upon the type of raw material and methods of manufacture, may be illustrated by an analysis of a typical commercial salmon meal. Here we find the following:

| | Per cent |
|---|---|
| Protein | 60 |
| Ash | 18 |
| Oil | 10.50 |
| Moisture | 7.50 |

With reference to the protein content, it has been found that the proportions of amino-acids therein, including tyrosine, tryptophane, cystine, lysine, histidine and arginine, which are considered by experts as being essential for proper nutrition, are present in substantial quantities. The mineral content of the ash, including potassium, sodium, iron, calcium, magnesium, phosphorus and sulphur, supplies in sufficient quantities the essential materials for maximum bone and gland growth and in a form readily assimilated by the animal or fowl. The oil is also an important factor in nutrition, since it carries vitamin values, particularly vitamins A and D, which are entirely adequate for animal feeding.

Fish meal as heretofore produced, because of its loosely comminuted state, is subject to rapid deterioration, and, if stored for any considerable length of time, loses, to an appreciable extent, its potency as a food concentrate. It will be readily appreciated that the meal as it comes from the grinder is composed of a mass of loosely grouped granules interspersed with voids into which the atmosphere may readily penetrate, and this condition is not materially changed by sacking or other methods of handling now commonly employed. The oil contained in the meal is, therefore, rapidly oxidized, and food and vitamin potency lost. Furthermore, there results a deterioration of certain of the amino-acids and minerals. These facts are generally recognized by the trade, with the result that newly manufactured meal brings considerably higher prices than meal that has been stored for several months.

The meal as produced commercially in its loose form is bulky and, therefore, cannot be stored, shipped or otherwise handled with maximum economy. Furthermore, the meal in its common comminuted state provides a fertile and enticing field for the entry and rapid development of insects and other microorganisms which rapidly depreciate the marketability of the product by destroying its potent properties as a food concentrate.

By my invention I overcome in substantial measure all of the foregoing objections. In carrying out my invention I take the commercial fish meal in its loosely comminuted state and, by means of pressure applied by any well-known pressing, molding or extruding machine, compact and consolidate the same into relatively small individual units or pellets, preferably of cylindrical or cubical shape. I employ sufficient pressure to assure such a firm consolidation of the meal that the resultant pellet will stand up during handling with minimum fracture and breakage; also, that the compacted meal shall be substantially free of voids and, therefore, highly resistant to atmospheric penetration.

In practice I have found that when the meal is consolidated into individual units and to the extent above pointed out, it takes up only about one-half the space required for the loose meal. Therefore, there results a substantial saving in storage and shipping space, with consequent economy in handling. In addition, since substantially all voids have been removed from the meal, the atmosphere cannot readily penetrate thereinto and oxidation of the oil is reduced to a minimum and the food and vitamin values thereof conserved. The compacted pellet is also highly resistant to the inroads of insect life and the development of other micro-organisms. Thus the article can be stored over long periods of time without substantial deterioration or loss of potent food values.

While the individual units of consolidated meal, which I have above described, are highly resistant to oxidation and deterioration, I have found that it is of considerable advantage to seal the surface of the units, or at least the side surfaces thereof, in order to still further resist oxidation of the oil contained in the meal and obstruct the inroads of insect and bacteria life. For example, I have found that a glazed surface will aid materially in the preservation of the product. If, therefore, the pellet is provided with a glazed or burnished surface, such as produced by passing the same under pressure across a smooth hard surface, a substantial seal results and greater resistance to deterioration and loss of potent values is given to the article.

Fish meal alone is entirely too rich in food value to comprise the sole diet of animals and poultry. It is, therefore, the practice to mix the meal with cereal or vegetable rations in such proportions as to properly balance the diet, such diet ordinarily including from 5% to 25% of the food concentrate. The balanced ration is made up by the miller or manufacturer in such quantities as to meet current needs only. It is, therefore, important that he should have on hand at all times an adequate supply of meal which does not deteriorate or lose its potent food values during storage. The ability of my article to retain its potent properties over long periods of time fills this need of the miller or manufacturer and makes it possible for him to supply the trade with a properly balanced ration at any time.

To accomplish thorough and uniform mixing of the fish meal with the basal feed rations, it is desirable that the meal be in a loose or comminuted state. With my article this can be readily and economically accomplished, to the extent and whenever desired, by simply running the pellets through any well-known grinding or pulverizing machine.

While I have particularly described my invention as it pertains to fish meal, I do not wish to be so limited, because my invention is as readily applicable to meat meal and other types of food concentrate having nutritional factors that are subject to deterioration or loss by virtue of their loosely comminuted state.

It is apparent from the foregoing that my invention as an article of manufacture is particularly adaptable for storage, preservation and handling. It fills a long-felt need in the industry by providing a food concentrate in a form which can be stored over long periods of time without loss of its potent properties. It further provides an article highly resistant to the inroads of insects and other micro-organisms, yet capable of being quickly and economically converted, as and when desired, into a loosely comminuted state for mixing with other food rations.

I claim:

1. The method of preventing deterioration in the handling of cooked fish meal which consists in consolidating the loose meal into pellets substantially free from voids and providing the pellets with a burnished surface by passing the same under pressure across a smooth hard surface, thereby preserving the same against access of the atmosphere and the penetration of insect life.

2. The method of preparing fish meal for storage and shipping, consisting, in combination with the steps of cooking, pressing and grinding of the operation of compressing the meal into pellets of a cohesive character and substantially free of voids, and subsequently submitting said pellet to a burnishing action to give it a glazed surface.

EDGAR T. MEAKIN.